(12) United States Patent
Wakamatsu et al.

(10) Patent No.: US 6,531,073 B1
(45) Date of Patent: Mar. 11, 2003

(54) RARE EARTH ACTIVATED ALKALI EARTH METAL FLUOROHALIDE STIMULABLE PHOSPHOR, PREPARATION METHOD THEREOF AND RADIATION IMAGE CONVERSION PANEL

(75) Inventors: Hideaki Wakamatsu, Tokyo (JP); Haruhiko Masutomi, Tokyo (JP); Yasushi Nakano, Tokyo (JP); Akihiro Maezawa, Tokyo (JP); Hiroto Itoh, Tokyo (JP); Isao Kobayashi, Tokyo (JP); Sadatoshi Nishibuchi, Tokyo (JP)

(73) Assignee: Konica Corporation, Tokyo (JP)

( * ) Notice: Subject to any disclaimer, the term of this patent is extended or adjusted under 35 U.S.C. 154(b) by 43 days.

(21) Appl. No.: 09/734,511

(22) Filed: Dec. 11, 2000

(30) Foreign Application Priority Data

Dec. 24, 1999 (JP) ............................................. 11-366453
Jan. 13, 2000 (JP) ........................................ 2000-004274

(51) Int. Cl.$^7$ .......................... C09K 11/61; C09K 11/08; G03B 42/02; G21K 4/00
(52) U.S. Cl. ............................................. 252/301.4 H
(58) Field of Search .................... 252/301.4 H, 301.4 R

(56) References Cited

U.S. PATENT DOCUMENTS

| | | | | |
|---|---|---|---|---|
| 5,534,191 | A | * | 7/1996 | Hasegawa et al. ... 252/301.4 H |
| 5,904,995 | A | * | 5/1999 | Maezawa et al. ......... 250/484.4 |
| 6,168,730 | B1 | * | 1/2001 | Nabeta et al. ....... 252/301.4 H |
| 2002/0001669 | A1 | * | 1/2002 | Wakamatsu et al. . 252/301.4 H |

FOREIGN PATENT DOCUMENTS

| | | |
|---|---|---|
| JP | 55-069281 | 5/1980 |
| JP | 59-012144 | 1/1984 |
| JP | 59-27289 | 2/1984 |
| JP | 59-027980 | 2/1984 |
| JP | 59-056479 | 3/1984 |
| JP | 60-70484 | 4/1985 |
| JP | 60-078151 | 5/1985 |
| JP | 60-141783 | 7/1985 |
| JP | 60-157099 | 8/1985 |
| JP | 60-157100 | 8/1985 |
| JP | 60-217354 | 10/1985 |
| JP | 61-21173 | 1/1986 |
| JP | 61-040390 | 2/1986 |
| JP | 61-120883 | 6/1986 |
| JP | 61-120885 | 6/1986 |
| JP | 61-235486 | 10/1986 |
| JP | 61-235487 | 10/1986 |
| JP | 07-233369 | 9/1995 |
| JP | 09-291278 | 11/1997 |
| JP | 10-140148 | * 5/1998 |

* cited by examiner

Primary Examiner—C. Melissa Koslow
(74) Attorney, Agent, or Firm—Frishauf, Holtz, Goodman & Chick, P.C.

(57) ABSTRACT

A method for preparing a rare earth activated alkaline earth metal fluorohalide stimulable phosphor represented by formula $(Ba_{1-x}M^2_x)FBr_yI_{1-y}:aM_1, bLn, cO$ is discloded, comprising the steps of (a) preparing an aqueous mother liquor containing $BaX_2$ of not less than 2.0 mol/l and a halide of Ln, (b) adding an aqueous solution containing an inorganic fluoride of not less than 5 mol/l to the mother liquor while maintaining a temperature of at least 50° C. to form a crystalline precipitate of a precursor of the stimulable phosphor, (c) separating the precipitate of the precursor from the mother liquor, and (d) calcining the separated precipitate.

42 Claims, No Drawings

RARE EARTH ACTIVATED ALKALI EARTH METAL FLUOROHALIDE STIMULABLE PHOSPHOR, PREPARATION METHOD THEREOF AND RADIATION IMAGE CONVERSION PANEL

FIELD OF THE INVENTION

The present invention relates to a rare earth activated alkaline earth metal fluorohalide stimulable phosphor, a method for preparing the stimulable phosphor and a radiation image conversion panel by the use of the stimulable phosphor.

BACKGROUND OF THE INVENTION

As an effective means for replacing conventional radiography is known a recording and reproducing method of radiation images using stimulable phosphors described in JP-A No. 55-12148 (hereinafter, the term, JP-A refers to an unexamined and published Japanese Patent Application).

In the method, a radiation image conversion panel (hereinafter, also simply denoted as panel) comprising a stimulable phosphor is employed, and the method comprises the steps of causing the stimulable phosphor of the panel to absorb radiation having passed through an object or having radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photoelectrically detecting the emitted light to obtain electrical signals, and reproducing the radiation image of the object as a visible image from the electrical signals. The panel having been read out is subjected to image-erasing and prepared for the next photographing cycle. Thus, the radiation image conversion panel can be used repeatedly.

In the radiation image recording and reproducing methods described above, a radiation image is advantageously obtained with a sufficient amount of information by applying radiation to an object at a considerably smaller dose, as compared to conventional radiography employing a combination of a radiographic film and a radiographic intensifying screen. Further, in the conventional radiography, the radiographic film is consumed for every photographing; on the other hand, in this radiation image converting method, in which the radiation image conversion panel is employed repeatedly, is also advantageous in terms of conservation of resources and economic efficiency.

The radiation image conversion panel employed in the radiation image recording and reproducing method basically comprises a support and provided thereon a phosphor layer (stimulable phosphor layer), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder, and which comprises an aggregated stimulable phosphor. There is further known a radiation image conversion panel in which a polymeric material is contained in the openings among the aggregated stimulable phosphor. On the surface of the stimulable phosphor layer (i.e., the surface which is not in contact with the support) is conventionally provided a protective layer comprising a polymeric film or an evaporated inorganic membrane to protect the phosphor layer from chemical deterioration and physical shock.

The stimulable phosphor, after being exposed to radiation, produces stimulated emission upon exposure to the stimulating ray. In practical use, phosphors are employed, which exhibit an emission within a wavelength region of 300 to 500 nm stimulated by stimulating light of wavelengths of 400 to 900 nm. Examples of such stimulable phosphors include rare earth activated alkaline earth metal fluorohalide phosphors described in JP-A Nos. 55-12145, 55-160078, 56-74175, 56-116777, 57-23673, 57-23675, 58-206678, 59-27289, 59-27980, 59-56479 and 59-56480; bivalent europium activated alkaline earth metal fluorohalide phosphors described in JP-A Nos. 59-75200, 6-84381, 60-106752, 60-166379, 60-221483, 60-228592, 60-228593, 61-23679, 61-120882, 61-120883, 61-120885, 61-235486 and 61-235487; rare earth element activated oxyhalide phosphors described in JP-A 59-12144; cerium activated trivalent metal oxyhalide phosphors described in JP-A No. 55-69281; bismuth activated alkaline metal halide phosphors described in JP-A No. 60-70484; bivalent europium activated alkaline earth metal halophosphate phosphors described in JP-A Nos. 60-141783 and 60-157100; bivalent europium activated alkaline earth metal haloborate phosphors described in JP-A No. 60-157099; bivalent europium activated alkaline earth metal hydrogenated halide phosphors described in JP-A 60-217354; cerium activated rare earth complex halide phosphors described in JP-A Nos. 61-21173 and 61-21182; cerium activated rare earth halophosphate phosphors described in JP-A No. 61-40390; bivalent europium activated cesium rubidium halide phosphors described in JP-A No. 60-78151; bivalent europium activated cerium halide rubidium phosphors described in JP-A No. 60-78151; bivalent europium activated composite halide phosphors described in JP-A No. 60-78153. Specifically, iodide-containing bivalent europium activated alkaline earth metal fluorohalide phosphors, iodide containing rare earth metal activated oxyhalide phosphors and iodide containing bismuth activated alkaline earth metal halide phosphors exhibited stimulated emission of high luminance.

Along with the spread of radiation image conversion panels employing stimulable phosphors is further desired an enhancement of radiation image quality, such as enhancements of sharpness and graininess.

The foregoing preparation methods of stimulable phosphors are called a solid phase process or calcination method, in which pulverization after calcination is indispensable and there were problems such that it was difficult to control the particle form affecting sensitivity and image performance.

Of means for enhancing image quality of radiation images are valid preparation of fine particles of a stimulable phosphor and enhancing particle size uniformity of the fine stimulable phosphor particles, i.e., narrowing the particle size distribution.

Preparation of stimulable phosphors in the liquid phase described in JP-A 9-291278 and 7-233369 is a method of obtaining a stimulable phosphor precursor in the form of fine particles by adjusting the concentration of a phosphor raw material solution, which is valid as a method of preparing stimulable phosphor powder having narrow particle size distribution. From the thus obtained phosphor precursor, a stimulable phosphor was obtained by subjecting the precursor to calcination at high temperature to provide stimulated light-emissive ability but its stimulated emission intensity was not sufficient. The radiation image conversion plate employing such a stimulable phosphor exhibiting a relatively low stimulated emission intensity leads to one having a low sensitivity, so that more dose is required to obtain radiation images having image quality of the same level.

SUMMARY OF THE INVENTION

An object of the present invention is to obtain a rare earth activated alkaline earth metal fluorohalide stimulable phosphor exhibiting high luminance, to obtain enhanced stimulated emission intensity in a rare earth activated alkaline earth metal fluorohalide stimulable phosphor comprised of fine particles with high homogeneity of the particle size distribution, and to provide a radiation image conversion panel employing the rare earth activated alkaline earth metal fluorohalide stimulable phosphor and exhibiting high sensitivity and high image quality.

An object of the present invention is to enhance the stimulated light emission intensity, i.e., sensitivity of a stimulable phosphor and to provide a rare earth activated alkaline earth metal fluoroiodide stimulable phosphor exhibiting superior sharpness and graininess, a preparation method thereof and a radiation image conversion panel by the use thereof.

An object of the present invention is to provide a method for preparing a impurity-free stimulable phosphor, in which the preparation process is shortened.

The above object of the invention can be accomplished by the following embodiments:

1. A method for preparing an oxygen-introduced rare earth activated alkaline earth metal fluorohalide stimulable phosphor represented by the following formula (1):

$$(Ba_{1-x}M^2{}_x)FBr_yI_{1-y}\cdot aM_1, bLn, cO \qquad \text{formula (1)}$$

wherein $M^1$ is at least an alkali metal selected from the group consisting of Li, Na, K, Rb and Cs; $M^2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are numbers meeting the following conditions:

$0 \leq x \leq 0.5,\ 0 \leq y \leq 1,\ 0 \leq a \leq 0.05\ 0 \leq b \leq 0.2\ \text{and}\ 0 \leq c \leq 0.1$ the method comprising the steps of:
(a) preparing an aqueous mother liquor containing $BaX_2$ of not less than 2.0 mol/l and a halide of Ln, in which X is Br or I, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 5 mol/l to the mother liquor while maintaining the mother liquor at a temperature of at least 50° C. to form a crystalline precipitate of a precursor of the stimulable phosphor,
(c) separating the precipitate of the precursor from the mother liquor, and
(d) calcining the separated precipitate;

2. A method for preparing the rare earth activated alkaline earth metal fluorohalide stimulable phosphor represented by the foregoing formula (1), the method comprising the steps of:
(a) preparing an mother liquor containing an ammonium halide of not less than 3 mol/l and a halide of Ln, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 5 mol/l and an aqueous solution containing $BaX_2$ (in which X is Br or I) to the mother liquor while maintaining the mother liquor at a temperature of at least 50° C. to form a crystalline precipitate of a precursor of the stimulable phosphor,
(c) separating the precipitate from the mother liquor, and
(d) calcining the separated precipitate;

3. A method for preparing a rare earth activated alkaline earth metal fluorohalide stimulable phosphor represented by the foregoing formula (1), the method comprising the steps of:
(a) preparing an aqueous mother liquor containing $BaX_2$ (in which X is Br or I) of not less than 2.0 mol/l, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 5 mol/l and an aqueous solution containing a halide of Ln to the mother liquor while maintaining the mother liquor at a temperature of at least 50° C. to form a crystalline precipitate of a precursor of the stimulable phosphor,
(c) separating the precipitate from the mother liquor, and
(d) calcining the separated precipitate;

4. A method for preparing a rare earth activated alkaline earth metal fluorohalide stimulable phosphor represented by the foregoing formula (1), the method comprising the steps of:
(a) preparing an aqueous mother liquor containing an ammonium halide of not less than 3 mol/l, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 5 mol/l an aqueous solution containing $BaX_2$ (in which X is Br or I) and an aqueous solution containing a halide of Ln to the mother liquor while maintaining the mother liquor at a temperature of at least 50° C. to form a crystalline precipitate of a precursor of the stimulable phosphor,
(c) separating the precipitate from the mother liquor, and
(d) calcining the separated precipitate while avoiding sintering of the precipitate;

5. A method for preparing a rare earth activated alkaline earth metal fluorohalide stimulable phosphor represented by the foregoing formula (1), the method comprising the steps of:
(a) preparing an aqueous mother liquor containing an ammonium halide of not less than 3 mol/l, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 5 mol/l and an aqueous solution containing $BaX_2$ (in which X is Br or I) to the mother liquor while maintaining the mother liquor at a temperature of at least 50° C. to form a crystalline precipitate of an alkaline earth-metal fluorohalide, (c) separating the precipitate from the mother liquor, and (d) mixing the separated precipitate with a halide of Ln and calcining the mixture;

6. The method described in any one of the foregoing embodiments, wherein the formula (1) is represented by the following formula:

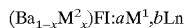

wherein $M^1$ is at least an alkali metal selected from the group consisting of Li, Na, K, Rb and Cs; $M^2$ is at least one selected from the group consisting of Ca and Sr; Ln is at least one rare earth element selected from the group consisting of Ce, Pr, Sm, Eu, Gd, Tb, Tm and Yb; and x, y and Z are numbers meeting the following conditions:

$$0 \leq x 0.5, \ 0 \leq a \leq 0.05 \text{ and } 0 \leq b < 0.2;$$

7. The method described in any one of the foregoing embodiments 1 to 5, wherein $0 \leq y \leq 0.2$ and $0 \leq c \leq 0.1$;

8. The method described in any one of the foregoing embodiments 1 to 5, wherein $0 \leq y \leq 0.3$ and $0 \leq c \leq 0.1$;

9. The method described in any one of the foregoing embodiments 1 to 6, wherein y=0, c=0, Ln is at least one rare earth element selected from the group consisting of Ce, Pr, Sm, Eu, Gd, Tb, Tm and Yb, and $BaX_2$ is $BaI_2$;

10. The method for preparing the rare earth activated alkaline earth metal fluoroiodide stimulable phosphor described in 2 above, wherein in the step (b), the fluoride and $BaX_2$ are added while the ratio of fluorine to barium is kept constant;

11. The method described in any one of the foregoing embodiments, wherein the inorganic fluoride is ammonium fluoride or an alkali metal fluoride;

12. The method described in any one of the foregoing embodiments, wherein in the step of (d), the separated precipitate is calcined while avoiding sintering of the precipitate;

13. A radiation image conversion panel comprising a phosphor layer containing a rare earth activated alkaline earth metal fluoroiodide stimulable phosphor prepared by the method described in any one of the foregoing embodiments.

DETAILED DESCRIPTION OF EMBODIMENTS OF THE INVENTION

The present invention will be described in detail.

In this invention, the precursor of a stimulable phosphor refers to a substance substantially exhibiting no stimulated light emission or no instantaneous emission. An example thereof is a substance represented by formula (1), which has not been exposed under an atmosphere of a temperature of 600° C. or more.

Preparation of Precursor Crystal Precipitate and Stimulable Phosphor

Preparation methods of precipitates of a precursor crystal in the foregoing embodiments will now be described.

Preparation Method of the Foregoing Embodiments 1 and 3

$BaX_2$ (X=Br or I), and, if necessary, a halide of $M^2$ and a halide of $M_1$ are introduced into an aqueous medium and dissolved with sufficiently stirring to form an aqueous solution (hereinafter, also denoted as mother liquor), provided that the ratio of $BaX_2$ to the aqueous medium is so adjusted that the $BaX_2$ concentration is not less than 2.0 mol/l, preferably not less than 2.5 mol/l, more preferably not less than 3.5 mol/l, and still more preferably not less than 4.3 mol/l. In this case, a small amount of an acid, ammonia, an alcohol, a water-soluble polymer or a fine powdery water-insoluble metal oxide may be optionally added thereto. The aqueous solution is maintained at a temperature of 50° C. or more, preferably 80° C. or more, and 98° C. or less as the upper limit. Further, an aqueous solution of an inorganic fluoride (e.g., ammonium fluoride, alkali metal fluoride) of not less than 5 mol/l, preferably not less than 8 mol/l, more preferably not less than 12 mol/l, and 15 mol/l or less as the upper limit is added thereto to form precipitates of a precursor crystal of a rare earth activated alkaline earth metal fluorohalide stimulable phosphor.

One feature of embodiment 1 is that a halide of Ln is contained in mother liquor in advance. The halide of Ln is preferably allowed to exist in the mother liquor prior to addition of an inorganic fluoride. Thus, the addition of the halide of Ln results in phosphor precursor particles which occlude Ln mainly in the center of the particle, leading to enhanced durability of phosphor particles and a radiation image conversion panel by the phosphor particles.

Embodiment 3 includes the step of adding an inorganic fluoride and a halide of Ln to the mother liquor, in which the halide of Ln may be added at any time between addition of the inorganic fluoride and before-separating the precursor, and is preferably added simultaneously with the addition of the inorganic fluoride. The manner of adding the halide of Ln is not specifically limited, but it is preferably added at a temperature of 20 to 98° C., and more preferably at a temperature close to that of the mother liquor. According to embodiment 3, Ln is distributed from the center to the outer surface of the particle, leading to enhanced durability of phosphor particles and a radiation image conversion panel by the phosphor particles and enhanced balance of luminance.

Preparation Method of the Foregoing Embodiments 2, 4 and 5

A mother liquor containing an ammonium halide ($NH_4Cl$, $NH_4Br$, and $NH_4I$) of not less than 3 mol/l, and preferably not less than 4 mol/l is prepared, with proviso that when x of formula (1) is not zero, the mother liquor further contains a halide of $M^2$, and when a is not zero, the mother liquor further contains a halide of $M^1$, and after these are dissolved, the ammonium halide is added thereto. Further thereto, an aqueous solution of an inorganic halide (e.g., ammonium fluoride, alkali metal fluoride) of not less than 5 mol/l (preferably not less than 8 mol/l, and more preferably not less than 12 mol/l) and an aqueous $BaX_2$ (X=Br, I) solution are added while maintaining the mother liquor at a temperature of 50° C. or higher, preferably 80° C. or higher, and 98° C. or lower as the upper limit. The crystalline precursor of a rare earth activated alkaline earth metal fluorohalide stimulable phosphor can be thus obtained.

In embodiment 2, a halide of Ln is preferably allowed to exist in the mother liquor prior to addition of an inorganic fluoride. Thus, the addition of the halide of Ln results in phosphor precursor particles which occlude Ln mainly in the center of the particle, leading to enhanced durability of phosphor particles and a radiation image conversion panel by the phosphor particles.

Embodiment 4 includes the step of adding an inorganic fluoride and a halide of Ln to the mother liquor, in which the halide of Ln may be added at any time between addition of the inorganic fluoride and before separating the precursor, and is preferably added simultaneously with the addition of the inorganic fluoride. The manner of adding the halide of Ln is not specifically limited, but it is preferably added at a temperature of 20 to 98° C., and more preferably at a temperature close to that of the mother liquor. According to embodiment 4, Ln is distributed from the center to the outer surface of the particle, leading to enhanced durability of phosphor particles and a radiation image conversion panel by the phosphor particles and enhanced balance of luminance.

In embodiment 5, a halide of Ln is added after separation of the precursor precipitate and before calcination, thereby leading to enhanced luminance of the phosphor particles and a radiation image conversion panel by the use of the phosphor.

In each of the embodiments (specifically, embodiments 2, 4 and 5), it is preferred that an aqueous inorganic fluoride solution and an aqueous $BaX_2$ solution are added continuously or intermittently so that the ratio of fluorine of the former and Ba of the latter is kept constant. Addition is conducted using a pipe provided with a pump, and preferably in the vicinity of the region vigorously stirred. There is thus formed a precipitate of the phosphor precursor by allowing the reaction to proceed so that an Ba ion is not in excess during the formation of the precipitate.

In embodiments 2, 4 and 5, the aqueous $MX_2$ solution is added preferably in a concentration of not less than 2.0 mol/l, more preferably not less than 2.5 mol/l, and still more preferably not les than 3.5 mol/l, and preferably not more than 5 mol/l as the upper limit. The solution is also added preferably at a temperature 20 to 98° C. and more preferably at a temperature close to that of the mother liquor.

Examples of preferred inorganic fluoride used in the invention include hydrogen fluoride, ammonium fluoride, $NH_4F.HF$, and alkali metal fluoride such as potassium fluoride, lithium fluoride and sodium fluoride. An aqueous inorganic fluoride solution is added through a pipe provided with a pump, and in a concentration of not less than 5 mol/l, preferably not less than 8 mol/l, and more preferably not less than 12 mol/l. Using aqueous inorganic fluoride solution of such a concentration, (1) reduction in particle size is enhanced and (2) impurities included within the particle is reduced to form highly purecrystals. Further, (3) narrowed distribution of Ln within the particle are achieved. Using such phosphor particles, there can be obtained a radiation image conversion panel exhibiting superior fading property, superior balance between sensitivity and sharpness and little unevenness in sensitivity.

It is preferred that an inorganic fluoride is added continuously or intermittently while keeping the ration of fluorine to barium constant. Thus, crystals having a homogeneous element composition in the depth direction can be obtained by keeping constant the ratio of F:Ba to be added. There can be obtained a phosphor exhibiting little variation in performance by calcining the crystals. An aqueous inorganic fluoride solution is added preferably at a temperature 20 to 40° C.

In cases where a halide of Ln is added in the form of an aqueous solution, the concentration thereof is preferably 0.1 to 1.0 mol/l. In the case of solid, it is added in accordance with the content of the intended phosphor.

Method of Introducing Oxygen

Representative embodiments of the method of preparing an oxygen-introduced rare earth activated alkaline earth metal fluorohalide stimulable phosphor will be described. Oxygen can be introduced by adding a compound represented by the following formula (2) during the process of preparing the phosphor.

Next, the compound represented by formula (2) will be described:

$A_lB_mO_n$  formula (2)

wherein A represents a hydrogen atom or at least an element selected from groups 1 and 2 of the periodic table; B represents at least an element selected from groups 13 through 17 of the periodic table; 1 is a positive natural number more than 0; m is a positive natural number more than 0; and n is a positive natural number more than 0. Of the compounds represented by formula (2), representative one is a compound comprised of an oxygen acid (or oxyacid) anion of an element of groups 1 and 2 of the periodic table, and hydrogen, an alkali metal or an alkaline earth metal.

Thus, A is preferably at least one of H, Li, Na, K, Rb, Cs, Be, Mg, Ca, Sr and Ba. Of these H, Na, K, Ca, Sr and Ba are more preferred and H, Na and K are still more preferred. B is preferably B, Al, C, Si, N, P, S, Se, Br or I, and more preferably C, N and S. Of the compounds represented by formula (2), $H_2CO_3$, $Na_2CO_3$, $K_2CO_3$, $CaCO_3$, $BaCO_3$, $HNO_3$, $NaNO_3$, $KNO_3$, $Ca(NO_3)_2$, $Ba(NO_3)_2$, $H_2SO_4$, $Na_2SO_4$, $K_2SO_4$, $CaSO_4$, $BaSO_4$, HBr, $NaBrO_3$, $KBrO_3$, $HIO_3$, $NaIO_3$, $KIO_3$, $HIO_4$, and $NaIO_4$ are preferred, and $Na_2CO_3$, $K_2CO_3$, $HNO_3$, $NaNO_3$, $KNO_3$ AND $Ba(NO_3)_2$ are more preferred.

The compound represented by formula (2) is added preferably in an amount of 0.00001 to 0.3. mol, and more preferably 0.00005 to 0.2 mol per mol of an alkaline earth metal contained in an alkaline earth metal fluorohalide stimulable phosphor. The amounts within this range result in luminance-enhancing effects.

The effect of addition of the compound of formula (2) is attributable to the fact that the presence of an oxygen containing anion of the compound of formula (2) simplifies control of introducing oxygen in the calcination process following the synthesis process of the precursor.

In cases where a phosphor precursor is synthesized in the liquid phase, a compound represented by the following formula (3) is preferably contained in an amount of not less than 5 mg per kg of the precursor:

$B_mO_{n-z}$  formula (3)

wherein B is at least an element selected from groups 13 through 17 of periodic table; m, n and z each are an integer of 1 or more. In the formula (3), B and m are respectively the element and number of formula (2). Representative compounds of formula (3) are oxyacid anions of the compounds of formula (2). Of the anions, $CO_3^{2-}$, $NO_3^{2-}$, $SO_4^-$, $BrO_3^-$, $BrO_4^-$, $IO_3^-$ and $IO_4^-$ are preferred. The presence of this anion in the precursor simplifies control of introducing oxygen in the process of calcination. The content of the anion in the precursor is preferably 5 mg to 2 g, and more preferably 50 mg to 1 g per kg of a precursor. The content of the anion can be determined by ion chromatography. The ion chromatography is preferably carried out in accordance with the following conditions:

Measurement apparatus: DX5A0 Gradient Ion Chromatography (available from DIONEX Corp.)

Measurement conditions:
  Column:
    guard column, Ion Pac AG11 and
    separation column, AS11 (available from DIONEX Corp.)
  Eluate condition:
    A: 100 mM NaOH
    B: ultrapure water gradient of A/B=1/99 (at the star of analysis) and 30/70 (at the finish of analysis)

Suppressor:
ASRS-II (available from DIONEX Corp.)
  external mode
  SRS current of 300 mA
Regenerate liquid:
Ultrapure water (supplied by 10 psi of high purity nitrogen)
Detection:
  conductivity Separation Process The resulting crystal of the phosphor precursor are separated from the solution through filtration or centrifugation, washed sufficiently with liquid such as methanol and dried.

Calcination Process

It is preferred that calcination be carried out with avoiding sintering to undergo uniform reduction reaction of the activator. To the dried crystal of the phosphor precursor was added an anti-sintering agent such as alumina fine powder or silica fine powder, which is adhered to the surface of the crystals to prevent siltering. It is possible to save addition of the anti-sintering agent by choosing the calcination condition.

Further, the phosphor precursor crystals are charged into a heat-resistant vessel such as silica port, alumina crucible or silica crucible and then placed in a central portion of an electric furnace to be calcined without causing the crystals to sinter. The crystals are calcined at a temperature of 400 to 1300° C. and preferably 500 to 1000° C. The calcination time is dependent on the charging amount of a raw material mixture of the phosphor, the calcination temperature and a temperature at the time of being taken out from the furnace, and preferably 0.5 to 12 hrs.

Calcination is carried out in an atmosphere, e.g., in a neutral atmosphere such as nitrogen gas atmosphere, argon gas atmosphere or nitrogen gas atmosphere containing a small amount of hydrogen gas, weakly reducing atmosphere such as carbon dioxide atmosphere containing a small amount of carbon mono-oxide, or an atmosphere in which a small amount of oxygen is introduced.

Sample Preparation

A given amount of a presursor is dissolved in ultrapure water to make a prescribed amount of an aqueous solution. After subjecting to pretreatment in a cartridge, the solution is measured by ion chromatography.

Pre-treatment cartridge:
  OnGuard-Ag (available from DIONEX Corp.).

According to this method, for example, peaks of nitrate ion and sulfate ion are observed at a retention time of 12 min. and 18 min., respectively.

The intended rare earth activated alkaline earth metal fluoroiodide stimulable phosphor can be obatained through calcination. Examples of obtained phosphors inclyde
$BaFI:0.005Eu$; $BaFI:0.001Eu$, $Ba0.97Sr0.03FI:0.0001K, 0.013Eu$;
$BaFI:0.0002K, 0.005Eu$; $Ba0.998Ca0.002FI:0.005Eu$;
$BaFI:0.005Ce$; $Ba0.99Ca0.01FI:0.0002K. 0.005Eu$; and
$BaFI:0.0001Ce,0.0001Tb$.

The particles relating to this invention preferably have an average particle size of 1 to 10 $\mu$m and are monodisperse, more preferably the average particle size of 1 to 5 $\mu$m and the distribution of particle size of not more than 20%, and still more preferably the average particle size of 1 to 3 $\mu$m and the distribution of particle size of not more than 15%. The average particle size is a mean value of sphere equivalent diameters of 200 particles which are selected at random from the electron micrograph.

Preparation of Panel, Phosphor Layer, Coating, Support and Protective Layer

As supports used in the radiation image converting panel according to the invention are employed a various types of polymeric material, glass and metals. Materials which can be converted to a flexible sheet or web are particularly preferred in handling as a information recording material. From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 80 to 1000 $\mu$m and preferably 80 to 500 $\mu$m in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate bytylate, polyvinyl alcohol and linear polyester. Of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound (s) are uniformly dispersed in a binder solution.

The binder is employed in an amount of 0.01 to 1 part by weight per 1 part by weight of the stimulable phosphor. A smaller amount of the binder is preferred in terms of sensitivity and sharpness of the radiation image converting panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiation image converting panel, the kind of the phosphor and an addition amount of the epoxy group-containing compound.

Examples of solvents used for preparing a coating solution of a stimulable phosphor layer include lower alcohols such as methanol, ethanol, isopropanol and n-butanol; ketones such as acetone, methyl ethyl ketone, methyl isobutyl ketone and cyclohexanone; esters of a lower fatty acid and lower alcohol such as methyl acetate, ethyl acetate and butyl acetate; ethers such as dioxane, ethylene glycol ethyl ether and ethylene glycol monomethyl ether; aromatic compounds such as tolyol and xylol; halogenated hydrocarbons such as methylene chloride and ethylene chloride; and a mixture thereof.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

There may be incorporated, in a coating solution of the stimulable phosphor layer, stearic acid, phthalic acid, caproic acid and oleophilic surfactants for the purpose of improving dispersibility of the stimulable phosphor particles. The plasticizer may optionally incorporated. Examples of the plasticizer include phthalate esters such as diethyl phthalate and dibutyl phthalate; aliphatic dibasic acid esters such as diisodecyl succinate and dioctyl adipinate; and glycolic acid eaters such as ethylphthalylethyl glycolate and butylphthalylbutyl glycolate.

The coating solution as prepared above was uniformly coated on the surface of the subbing layer to form a coating layer. Coating can be carried out by conventional coating means, such as doctor blade, roll coater and knife coater. Subsequently, the coated layer is gradually dried to complete formation of the stimulable phosphor layer on the subbing layer. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support.

Examples of europium activated barium fluoroiodide stimulable phosphor are mainly described herein but preparation of stimulable phosphors including europium activated barium fluoroiodide and others can be performed with reference to the foregoing.

Of phosphors represented by formula (1), the following phosphors are preferably employed to prepare a radiation image conversion panel:

1) a rare earth activated alkaline earth metal fluorohalide stimulable phosphor represented by the following formula (A):

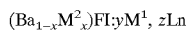

$$(Ba_{1-x}M^2{}_x)FI:yM^1, zLn \qquad \text{formula (A)}$$

wherein $M^2$ is at least an alakaline earth metal selected from Sr and Ca, $M^1$ is at least an alkali metal selected from the group consisting of Li, Na, K, Rb, and Cs; Ln is at least one element selected from Ce, Pr, Sm, Eu, Gd, Tb, Tm and Yb; and $0 \leq x \leq 0.5$, $0 \leq y \leq 0.05$ and $0 < z \leq 0.2$;

2) phosphor of formula (1), in which $0 \leq y \leq 0.2$ and $0 < c \leq 0.1$;

3) phosphor of formula (1), in which $0 < y \leq 0.3$ and $0 < c \leq 0.1$.

EXAMPLES

Example 1

To synthesize a precursor of europium activated barium fluoroiodide stimulable phosphor, the reaction vessel was charged with 2780 ml of $BaI_2$ aqueous solution (3.6 mol/l) and 27 ml of $EuI_3$ aqueous solution (0.2 mol/l). Reaction mother liquor in the reaction vessel was maintained at a temperature of 83° C. with stirring, and thereto was added 322 ml of an aqueous solution of ammonium fluoride (8 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of a phosphor precursor of europium activated barium fluoroiodide. To prevent deformation of phosphor particles due to sintering during calcination and the change of particle size distribution due to fusing of particles, ultrafine-grained alumina was added thereto in an amount of 0.2% by weight, with stirring sufficiently to cause the alumina to adhere uniformly to the surface of the crystals.

The crystals were charged into a silica boat and calcined at 850° C. for 2 hrs. in an atmosphere of a hydrogen and nitrogen gas mixture, using a tube furnace to obtain europium activated barium fluoroiodide phosphor particles. The particles were subjected to classification to obtain particles with an average size of 7 μm.

Preparation of Radiation Image Conversion Panel

The thus prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with a given thickness was formed.

Next, fluoro-resin, fluoroolefin-vinyl ether copolymer (Lumiflon LF100, trade name, produced by Asahi Glass Co.) of 70 g, cross-linking agent, isocyanate (Desmodule Z4370, trade name, produced by Sumitomo-Bayer Urethane Co.) of 25 g bisphenol A-type epoxy resin of 5 g and silicone resin fine powder (KMP-590, trade name, produced by Shinetsu Kagaku Co., average particle size of 1 to 2 μm) of 10 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 μm was obtained. According to the above procedure, there was obtained a radiation image converting panels comprising a stimulable phosphor layer with a given thickness.

Example 2

To synthesize a precursor of europium activated barium fluoroiodide stimulable phosphor, the reaction vessel was charged with 2380 ml of $BaI_2$ aqueous solution (4.2 mol/l) and 27 ml of $EuI_3$ aqueous solution (0.2 mol/l). Reaction mother liquor in the reaction vessel was maintained at a temperature of 83° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of a phosphor precursor of europium activated barium fluoroiodide.

A radiation image conversion panel was prepared similarly to Example 1, except that the thus obtained crystal as above was employed.

Example 3

The reaction vessel was charged with 2500 ml of $NH_4I$ aqueous solution (4.5 mol/l) and 27 ml of $EuI_3$ aqueous solution (0.2N). Reaction mother liquor in the reaction vessel was maintained at a temperature of 83° C. with stirring, and thereto were added 200 ml of an aqueous solution of ammonium fluoride (13 mol/l) and 2380 ml of an aqueous solution of $BaI_2$ (4.2 mol/l) at a controlled flow rate by using a high-precision cylinder pump to form precipitates. Thereafter, the reaction mixture was further kept at the temperature for 2 hrs with stirring to ripen the precipitates. The precipitates were filtered, washed with methanol and dried in vacuo to obtain crystals of a phosphor precursor of europium activated barium fluoroiodide. Using the obtained crystals, a radiation image conversion panel was prepared in a manner similar to Example 1.

Example 4

To synthesize a precursor of europium activated barium fluoroiodide stimulable phosphor, the reaction vessel was charged with 2380 ml of $BaI_2$ aqueous solution (4.2 mol/l). Reaction mother liquor in the reaction vessel was maintained at a temperature of 83° C. with stirring, and thereto were added 200 ml of an aqueous solution of ammonium fluoride (13 mol/l) and 27 ml of an aqueous solution of $EuI_3$ (0.2 mol/l) at a controlled flow rate by using a high-precision cylinder pump to form precipitates. Thereafter, the reaction mixture was further kept at the temperature for 2 hrs with stirring to ripen the precipitates. The precipitates were filtered, washed with methanol and dried in vacuo to obtain crystals of a phosphor precursor of europium activated barium fluoroiodide. Using the thus obtained crystals, a radiation image conversion panel was prepared in a manner similar to Example 1.

Example 5

The reaction vessel was charged with 2500 ml of $NH_4I$ aqueous solution (4.5 mol/l). Reaction mother liquor in the reaction vessel was maintained at a temperature of 83° C. with stirring, and thereto were added 200 ml of an aqueous solution of $NH_4F$ (13 mol/l), 2380 ml of an aqueous solution of $BaI_2$ (4.2 mol/l) and 27 ml of $EuI_3$ aqueous solution (0.2 mol/l) at a controlled flow rate by using a high-precision cylinder pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained crystals, a radiation image conversion panel was prepared in a manner similar to Example 1.

Example 6

The reaction vessel was charged with 2380 ml of $BaI_2$ aqueous solution (4.2 mol/l). Reaction mother liquor in the reaction vessel was maintained at a temperature of 83° C. with stirring, and thereto was added 200 ml of an aqueous solution of $NH_4F$ (13 mol/l) at a controlled flow rate by using a high-precision cylinder pump to form precipitates. Thereafter, the reaction mixture was further kept at the temperature for 2 hrs with stirring to ripen the precipitates. The precipitates were filtered, washed with methanol and dried in vacuo to obtain crystals of a phosphor precursor of europium activated barium fluoroiodide. The obtained crystals of 530.40 g and $EuI_3.2H_2O$ of 2.13 g were mixed and the mixture was charged into a silica boat and calcined at 850° C. for 2 hrs. in an atmosphere of a hydrogen/nitrogen gas mixture, using a tube furnace to obtain europium activated barium fluoroiodide phosphor particles. Using the obtained phosphor particles, a radiation image conversion panel was prepared in a manner similar to Example 1.

Example 7

To synthesize a precursor of europium activated barium fluoroiodide stimulable phosphor, the reaction vessel was charged with 2380 ml of $BaI_2$ aqueous solution (4.2 mol/l) and 27 ml of $EuI_3$ aqueous solution (0.2 mol/l). Reaction mother liquor in the reaction vessel was maintained at a temperature of 83° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained phosphor particles, a radiation image conversion panel was prepared in a manner similar to Example 1.

Example 8

To synthesize a precursor of europium activated barium fluoroiodide stimulable phosphor, the reaction vessel was charged with 2380 ml of $BaI_2$ aqueous solution (4.2 mol/l) and 27 ml of $EuI_3$ aqueous solution (0.2 mol/l). Reaction mother liquor in the reaction vessel was maintained at a temperature of 83° C. with stirring, and thereto was added 200 ml of an aqueous solution of hydrogen fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained phosphor particles, a radiation image conversion panel was prepared in a manner similar to Example 1.

Example 9

To synthesize a precursor of europium activated barium fluoroiodide stimulable phosphor, the reaction vessel was charged with 2380 ml of $BaI_2$ aqueous solution (4.2 mol/l), 27 ml of $EuI_3$ aqueous solution (0.2 mol/l) and 129.5 g of KI powder. Reaction mother liquor in the reaction vessel was maintained at a temperature of 83° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained phosphor particles, a radiation image conversion panel was prepared in a manner similar to Example 1.

Example 10

The reaction vessel was charged with 2380 ml of $BaI_2$ aqueous solution (4.2 mol/l), 27 ml of $EuI_3$ aqueous solution (0.2 mol/l), 20.5 g of $SrI_2$ and 129.5 g of KI powder. Reaction mother liquor in the reaction vessel was maintained at a temperature of 83° C. with stirring, and thereto was added 250 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered; washed with methanol and dried in vacuo to obtain crystals of strontium-potassium-added europium activated barium fluoroiodide. Using the obtained phosphor particles, a radiation image conversion panel was prepared in a manner similar to Example 1.

Example 11

The reaction vessel was charged with 2380 ml of $BaI_2$ aqueous solution (4.2 mol/l) and 27 ml of $EuI_3$ aqueous solution (0.2 mol/l). Reaction mother liquor in the reaction vessel was maintained at a temperature of 90° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered; washed with methanol and dried in vacuo to obtain crystals of europium activated barium fluoroiodide. Using the obtained phosphor particles, a radiation image conversion panel was prepared in a manner similar to Example 1.

Example 12

To synthesize a precursor of europium activated barium fluoroiodide stimulable phosphor, the reaction vessel was charged with 2380 ml of $BaI_2$ aqueous solution (4.3 mol/l), 27 ml of $EuI_3$ aqueous solution (0.2 mol/l) and 129.5 g of KI powder. Reaction mother liquor in the reaction vessel was maintained at a temperature of 83° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained phosphor particles, a radiation image conversion panel was prepared in a manner similar to Example 1.

Example 13

To synthesize a precursor of europium activated barium fluoroiodide stimulable phosphor, the reaction vessel was charged with 2270 ml of $BaI_2$ aqueous solution (4.4 mol/l), 27 ml of $EuI_3$ aqueous solution (0.2 mol/l) and 129.5 g of KI powder. Reaction mother liquor in the reaction vessel was maintained at a temperature of 83° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained phosphor particles, a radiation image conversion panel was prepared in a manner similar to Example 1.

Comparative Example 1

To synthesize a precursor of europium activated barium fluoroiodide stimulable phosphor, the reaction vessel was charged with 2800 ml of $BaI_2$ aqueous solution (0.8 mol/l) and 6 ml of $EuI_3$ aqueous solution (0.2 mol/l). Reaction mother liquor in the reaction vessel was maintained at a temperature of 83° C. with stirring, and thereto was added 72 ml of an aqueous solution of ammonium fluoride (8 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained crystals, a radiation image conversion panel was prepared in a manner similar to Example 1.

Comparative Example 2

To synthesize a precursor of europium activated barium fluoroiodide stimulable phosphor, the reaction vessel was charged with 2380 ml of $BaI_2$ aqueous solution (3.6 mol/l) and 27 ml of $EuI_3$ aqueous solution (0.2 mol/l). Reaction mother liquor in the reaction vessel was maintained at a temperature of 83° C. with stirring, and thereto was added 644 ml of an aqueous solution of ammonium fluoride (4 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained crystals, a radiation image conversion panel was prepared in a manner similar to Example 1.

Comparative Example 3

To synthesize a precursor of europium activated barium fluoroiodide stimulable phosphor, the reaction vessel was charged with 2380 ml of $BaI_2$ aqueous solution (4.2 mol/l) and 27 ml of $EuI_3$ aqueous solution (0.2 mol/l). Reaction mother liquor in the reaction vessel was maintained at a temperature of 83° C. with stirring, and thereto was added 200 ml of an aqueous solution of ammonium fluoride (13 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained crystals, a radiation image conversion panel was prepared in a manner similar to Example 1.

Comparative Example 4

To synthesize a precursor of europium activated barium fluoroiodide stimulable phosphor, the reaction vessel was charged with 2800 ml of $BaI_2$ aqueous solution (0.8 mol/). Reaction mother liquor in the reaction vessel was maintained at a temperature of 83° C. with stirring, and thereto were added 44 ml of an aqueous solution of ammonium fluoride (13 mol/l) and 6 ml of an aqueous solution of $EuI_3$ (0.2 mol/l) at a controlled flow rate by using a high-precision cylinder pump to form precipitates. Thereafter, the reaction mixture was further kept at the temperature for 2 hrs with stirring to ripen the precipitates. The precipitates were filtered, washed with methanol and dried in vacuo to obtain crystals of a phosphor precursor of europium activated barium fluoroiodide. Using the obtained crystals, a radiation image conversion panel was prepared in a manner similar to Example 1.

Comparative Example 5

To synthesize a precursor of europium activated barium fluoroiodide stimulable phosphor, the reaction vessel was charged with 2800 ml of $BaI_2$ aqueous solution (0.8 mol/l) and 6 ml of $EuI_3$ aqueous solution (0.2 mol/l). Reaction mother liquor in the reaction vessel was maintained at a temperature of 83° C. with stirring, and thereto was added 72 ml of an aqueous solution of ammonium fluoride (8 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained crystals, a radiation image conversion panel was prepared in a manner similar to Example 1.

Comparative Example 6

To synthesize a precursor of europium activated barium fluoroiodide stimulable phosphor, the reaction vessel was charged with 2500 ml of $BaI_2$ aqueous solution (1.8 mol/l) and 12 ml of $EuI_3$ aqueous solution (0.2 mol/l). Reaction mother liquor in the reaction vessel was maintained at a temperature of 83° C. with stirring, and thereto was added 145 ml of an aqueous solution of ammonium fluoride (8 mol/l) by using a roller pump to form precipitates. Thereafter, the reaction mixture was further kept at the temperature for 2 hrs with stirring to ripen the precipitates. The precipitates were filtered, washed with methanol and dried in vacuo to obtain crystals of europium activated barium fluoroiodide. Using the obtained crystals, a radiation image conversion panel was prepared in a manner similar to Example 1.

Evaluation of Radiation Image Conversion Panel

With respect to sensitivity, the panel was exposed to X-rays at 80 KVp and then excited by the light of a He—Ne laser (633 nm). Then, the stimulated emission emitted from the phosphor layer was detected by a detector (photomultiplier with spectral sensitivity of S-5) to measure an intensity of the emission. The sensitivity was shown as a relative value.

With respect to sharpness, the panel was exposed to X-rays at 80 Kvp through a lead-made MTF chart and then excited by the He—Ne laser. Then, the stimulated emission emitted from the phosphor layer was detected and converted to electric signal. The electric signals were subjected to analog/digital conversion and recorded in a magnetic recording tape. The X-ray image recorded in the magnetic tape was analyzed by a computer. Thus, the sharpness of the image was evaluated according to the modulation transfer function at the spatial frequency of 2 cycles/mm (%) of the X-ray image recorded in the magnetic tape.

With respect to graininess, the panel was exposed to X-rays at 80 kVp through a lead-made MTF chart and then excited by the He—Ne laser. Then, the stimulated emission emitted from the phosphor layer was detected and converted to electric signal. The electric signals were recorded on a conventional photographic film through a film scanner and the resulting photographic image was visually evaluated with respect to graininess, by comparison with the graininess of a conventional X-ray photographic image which was obtained by using an intensifying screen and a X-ray photographic film. In Table 1, grade B means graininess substantially equal to that of the image obtained by conventional X-ray photography using the intensifying screen and photographic film; grade A means further superior graininess. Grade C means rather coarse graininess and grade D means markedly coarse graininess.

TABLE 1

| Example No. | Sensitivity | Sharpness (%) | Graininess |
|---|---|---|---|
| 1 | 1.50 | 92 | B |
| 2 | 1.60 | 97 | A |
| 3 | 1.50 | 91 | A |
| 4 | 1.50 | 92 | A |
| 5 | 1.50 | 93 | A |
| 6 | 1.40 | 92 | A |
| 7 | 1.50 | 92 | A |
| 8 | 1.60 | 93 | A |
| 9 | 1.65 | 92 | A |
| 10 | 1.65 | 92 | A |
| 11 | 1.50 | 100 | A |
| 12 | 1.70 | 97 | A |
| 13 | 1.60 | 97 | A |

TABLE 2

| Comp. Example No. | Sensitivity | Sharpness (%) | Graininess |
|---|---|---|---|
| 1 | 0.02 | 21 | D |
| 2 | 0.03 | 30 | C |
| 3 | 0.01 | 18 | D |
| 4 | 0.02 | 23 | D |
| 5 | 0.02 | 22 | D |
| 6 | 1.00 | 50 | C |

As shown in the foregoing, according to this invention, sensitivity of a stimulable phosphor can be enhanced and there can be provided a rare earth activated alkaline earth metal fluorohalide stimulable phosphor exhibiting superior sharpness and graininess, a preparation method thereof and a radiation image conversion panel by the use thereof.

Example A-1

A precursor of an europium activated barium fluoroiodide stimulable phosphor was prepared as follows. To a reactor vessel were added 2,500 ml of an aqueous $BaI_2$ solution (4 mol/l) and 26.5 ml of an aqueous $EuI_3$ solution (0.2 mol/l). Further thereto was added 72.9 ml of aqueous $HNO_3$ solution (6 mol/l). This reaction mother liquor was kept at 83° C. with stirring. To the reaction mother liquor was added 198 ml of an aqueous ammonium fluoride solution (13 mol/l) using a roller pump to form a precipitate. After completing addition, super fine-grained alumina powder was added in an amount of 1% by weight to prevent variation in grain form and grain size distribution due to sintering during calcination, and sufficiently stirred with a mixer to allow the super-fine alumina powder to uniformly be adhered onto the surface of the crystals.

The thus obtained stimulable phosphor precursor was charged into a quartz core tube with a volume of 10 liters of a batch type rotary kiln. A gas mixture comprised of 93% nitrogen, 5% hydrogen and 2% oxygen was flowed at a flow rate of 10 l/min. for a period of 20 min. to replace an atmosphere. After sufficiently replacing an atmosphere in the core, the flow rate of the gas mixture of 93% nitrogen, 5% hydrogen and 2% oxygen was decreased to 2 l/min. and the temperature was raised to 850° C. at a temperature increasing rate of 10° C. /min. with rotating the core tube at a rate of 2 rpm. After reaching a temperature of 850° C., a gas mixture comprised of 95% nitrogen and 5% hydrogen was flowed at a flow rate of 10 l/min. for 20 min. with maintaining a temperature at 850° C. to replace an atmosphere. Thereafter, the flow rate of the gas mixture of 95% nitrogen and 5% hydrogen was decreased to 2 /min. and the atmosphere was maintained further for 90 min. The atmosphere was cooled to 25° C. at a temperature decreasing rate of 10° C./min. and then, replaced by the air to obtain oxygen-introduced europium activated barium fluoroiodide stimulable phosphor particles. The thus obtained phosphor particles of oxygen-introduced europium activated barium fluoroiodide were sieved and the measurement with scanning type electron micrograph revealed that a mean particle size was 5 μm.

Preparation of Radiation Image Conversion Panel

The prepared phosphor of europium activated barium fluoroiodide of 427 g, a polyurethane resin (Desmorack 4125, trade name, produced by Sumitomo-Bayer Urethane Co.) of 15.8 g and bisphenol A-type epoxy resin of 2.0 g were added into a mixed solvent of methyl ethyl ketone and toluene (1:1) and dispersed by a propeller mixer and a coating solution of a phosphor layer with a viscosity of 25 to 30 PS. The coating solution was coated on a subbed polyethylene terephthalate film by using a doctor blade and dried at 100° C. for 15 min. and a phosphor layer with 200 μm in thickness was formed.

Fluoro-resin, fluoroolefin-vinyl ether copolymer (Lumiflon LF100, trade name, produced by Asahi Glass Co.) of 70 g, cross-linking agent, isocyanate (Desmodule Z4370, trade name, produced by Sumitomo-Bayer Urethane Co.) of 25 g bisphenol A-type epoxy resin of 5 g and silicone resin fine powder (KMP-590, trade name, produced by Shinetsu Kagaku Co., average particle size of 1 to 2 μm) of 10 g were added into a mixed solvent of toluene-isopropyl alcohol (1:1) and a coating solution of a protective layer was obtained. The coating solution was coated on the formed phosphor layer by using a doctor blade and dried at 120° C. for 30 min. to thermally harden the layer and a protective layer with a thickness of 10 μm was obtained. According to the above procedure, there was obtained a radiation image converting panels comprising a stimulable phosphor layer with a given thickness.

Example A-2

Crystalline particles of europium-activated barium fluoroiodide were obtained similarly to Example 1, except that addition of 6 mol/l $HNO_3$ to the mother liquor was replaced by addition of 44.19 g of $KNO_3$. Using the thus obtained crystalline particles, a radiation image conversion panel was prepared similarly to Example A-1.

Example A-3

$BaF_2$ powder of 175.3 g, $BaI^2$ powder of 391.1 g, $EuF_3$ of 0.418 g and $Ba(NO_3)_2$ were each weighted and mixedly pulverized in an automatic mortar. The foregoing stimulable phosphor precursor was charged into a quartz core tube with a volume of 10 liters of a batch type rotary kiln. A gas mixture comprised of 95% nitrogen and 5% hydrogen was flowed at a flow rate of 10 l/min. for a period of 20 min. to replace an atmosphere. After sufficiently replacing an atmosphere in the core, the flow rate of the gas mixture of 95% nitrogen and 5% hydrogen was decreased to 2 l/min. and the temperature was raised to 830° C. at a temperature increasing rate of 10° C. /min. with rotating the core tube at a rate of 2 rpm. After reaching a temperature of 830° C., a gas mixture comprised of 93% nitrogen and 5% hydrogen was flowed at a flow rate of 10 l/min. for 20 min. with maintaining a temperature at 830° C. to replace an atmosphere. Thereafter, the flow rate of the gas mixture of 93% nitrogen and 5% hydrogen was decreased to 2 l/min. and the atmosphere was maintained further for 90 min. The temperature was lowered to 5° C. at a rate of 10° C./min to return atmosphere, while maintaining the flow rate of 2 l/min of mixed gas of 93% nitrogen and 5% hydrogen. The thus obtained phosphor particles of oxygen-introduced europium activated barium fluoroiodide were sieved to obtain phosphor particles of a mean particle size was 5 μm. Using the phosphor particles, a panel was prepared according to the manner similar to Example A-1.

Example A-4

Phosphor particles of europium activated barium fluoroiodide were obtained similarly to Example A-1, except that $HNO_3$ was not used. The phosphor was further sieved to obtain particles having a mean size of 5 μm. Using the phosphor particles, a panel was prepared according to the manner similar to Example A-1.

Evaluation of Radiation Image Conversion Panel

The thus obtained panel samples were evaluated with respect to sensitivity, sharpness and graininess'similarly to Example 1. Results thereof are shown in Table 3. Sensitivity and sharpness were each represented by a relative value, based on the sensitivity or sharpness of Example A-4 being 100.

TABLE 3

| Example No. | Sensitivity | Sharpness | Graininess |
|---|---|---|---|
| A-1 | 109 | 109 | A |
| A-2 | 118 | 112 | A |
| A-3 | 110 | 102 | B |
| A-4 | 100 | 100 | B |

The mean particles size of the stimulable phosphor was determined using a scanning type electron micrograph.

Example A-5

Similarly to Example A-2, a stimulable phosphor of europium activated barium fluoroiodide having a mean particle size of 5 μm was prepared and using this phosphor, a panel was prepared according to the manner similar to Example A-1. Further, the content of a nitrate ion in the precursor prior to calcination was determined. Measurement was carried out using a gradient ion chromatography DX500 (available from DIONEX Corp.) through a suppressor system. Suppressor ASRS-II (available from DIONEX Corp.) was employed at a SRS current of 300 mA in an external mode. In regenerated liquid, ultrapure water was employed, which was supplied by 10 psi high purity nitrogen. Guard column IonPac AG11 and separation column IonPac AS11 (each of which is available from DIONEX Corp.) were employed. As the eluate conditions, aqueous 100 mM NaOH solution (denoted as A solution) and ultrapure water (denoted as B solution) were employed, the volume ratio of A solution to B solution at the start of analysis was set to A/B=1/99. The ratio was varied with the analyzing time so that the A/B was 12/88 at 15 min. later and 30/70 at 25 min. later. Detection was made using a conductivity detector. In measurements, a given amount of a precursor is dissolved in ultrapure water to make a prescribed amount of an aqueous solution. After subjecting to pretreatment in a cartridge, the solution is measured by the ion chromatography. For example, peaks of nitrate ion was found at a retention time of 12 min. A calibration curve for quantification was prepared using sodium nitrate.

Example A-6

Similarly to Example A-5, a stimulable phosphor of europium activated barium fluoroiodide having a mean particle size of 5 μm was prepared except that the amount of KNO$_3$ was changed to 4.42 g. Using this phosphor, a panel was prepared according to the manner similar to Example A-1. The content of a nitrate ion in the precursor prior at calcination was determined similarly to Example A-5.

Example A-7

Similarly to Example A-5, a stimulable phosphor of europium activated barium fluoroiodide having a mean particle size of 5 μm was prepared except that the amount of KNO$_3$ was changed to 132.57 g. Using this phosphor, a panel was prepared according to the manner similar to Example A-1. The content of a nitrate ion in the precursor prior at calcination was determined similarly to Example A-5.

The foregoing Examples A-5 to A-7 were evaluated with respect to sensitivity. Sensitivity was represented by a relative value, based on the sensitivity of Example A-5 being 100. Results thereof are shown in Table 4, along with the nitrate ion content of the precursor.

TABLE 4

| Example No. | Sensitivity | Nitrate ion (mg/kg precursor) |
| --- | --- | --- |
| A-5 | 100 | 340 |
| A-6 | 89 | 13 |
| A-7 | 95 | 3500 |

According to this invention, image characteristics such as sensitivity, sharpness and graininess are superior.

What is claimed is:

1. A method for preparing a rare earth activated alkaline earth metal fluorohalide stimulable phosphor represented by the following formula (1):

$$(Ba_{1-x}M^2_x)FBr_yI_{1-y} : aM_1, bLn, cO \quad \text{formula (1)}$$

wherein $M^1$ is at least an alkali metal selected from the group consisting of Li, Na, K, Rb and Cs; $M^2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are numbers meeting the following requirements:

$$0 \leq x \leq 0.5, \ 0 \leq y \leq 1, \ 0 \leq a \leq 0.050 < b \leq 0.2 \text{ and } 0 < c \leq 0.1$$

the method comprising the steps of:
(a) preparing an aqueous mother liquor containing BaX$_2$ of not less than 2.0 mol/l and a halide of Ln, in which X is Br or I, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 8 mol/l to the mother liquor while maintaining a temperature of at least 50° C. to form a crystalline precipitate of a precursor of the stimulable phosphor,
(c) separating the precipitate of the precursor from the mother liquor, and
(d) calcining the separated precipitate;
and wherein the method further comprises:
adding a compound represented by the following formula (2):

$$A_lB_mO_n \quad \text{formula (2)}$$

wherein A represents a hydrogen atom or at least an element selected from the group consisting of groups 1 and 2 of the periodic table; B represents at least an element selected from the group consisting of groups 13 through 17 of the periodic table; l, m and n each are an integer of 1 or more.

2. The method of claim 1, wherein in formula (1), y and c meet the following requirements:

$$0.1 \leq y \leq 0.2 \text{ and } 0 < c \leq 0.1.$$

3. The method of claim 1, wherein in formula (1), y and c meet the following requirements:

$$0 < y \leq 0.3 \text{ and } 0 < c \leq 0.1.$$

4. The method of claim 1, wherein in formula (1), y=0, c=0, Ln is at least one rare earth element selected from the group consisting of Ce, Pr, Sm, Eu, Gd, Tb, Tm and Yb, and BaX$_2$ is BaI$_2$.

5. The method of claim 1, wherein the compound represented by formula (2) is added before step (d).

6. The method of claim 1, wherein the precursor contains a compound represented by formula (3) in an amount of not less than 5 mg per kg of the precursor:

$$B_mO_{n-z} \quad \text{formula (3)}$$

wherein B represents at least an element selected from the group consisting of groups 13 through 17 of the periodic table; m, n and z each are an integer, of 1 or more.

7. The method of claim 1, wherein the inorganic fluoride is ammonium fluoride or an alkali metal fluoride.

8. The method of claim 1, wherein in step (b), the inorganic fluoride is contained in an amount of not less than 12 mol/l.

9. A radiation image conversion panel comprising a layer containing a rare earth activated alkaline earth metal fluorohalide stimulable phosphor prepared by the method as claimed in claim 1.

10. A method for preparing a rare earth activated alkaline earth metal fluorohalide stimulable phosphor represented by the following formula (1):

$$(Ba_{1-x}M^2_x)FBr_yI_{1-y} : aM_1, bLn, cO \quad \text{formula (1)}$$

wherein $M^1$ is at least an alkali metal selected from the group consisting of Li, Na, K, Rb and Cs; $M^2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are numbers meeting the following requirements:

$$0 \leq x \leq 0.5, \ 0 \leq y \leq 0.2, \ 0 \leq a \leq 0.05 \ 0 < b \leq 0.2 \text{ and } 0 < c \leq 0.1$$

the method comprising the steps of:
(a) preparing an mother liquor containing an ammonium halide of not less than 3 mol/l and a halide of Ln, provided that when x of the formula (1) is not zero, the mother liquor further contains a halide of $M^2$, and when a is not zero, the mother liquor further contains a halide of $M^1$,
(b) adding an aqueous solution containing an inorganic fluoride of not less than 8 mol/l and an aqueous solution containing BaX$_2$ to the mother liquor while maintaining a temperature of at least 50° C. to form a crystalline precipitate of a precursor of the stimulable phosphor, in which X is Br or I, (c) separating the precipitate from the mother liquor, and (d) calcining the separated precipitate.

11. The method of claim 10 wherein in formula (1), y and c meet the following requirements:

$$0 \leq y \leq 0.2 \text{ and } 0 < c = 0.1.$$

12. The method of claim 10, wherein when c is not zero in formula (1), the method further comprises:

adding a compound represented by the following formula (2)

$$A_l B_m O_n \quad \text{formula (2)}$$

wherein A represents a hydrogen atom or at least an element selected from the group consisting of groups 1 and 2 of the periodic table; B represents at least an element selected from the group consisting of groups 13 through 17 of the periodic table; l, m and n each are an integer of 1 or more.

13. The method of claim 12, wherein the compound represented by formula (2) is added before step (d).

14. The method of claim 13, wherein the precursor contains a compound represented by formula (3) in an amount of not less than 5 mg per kg of the precursor:

$$B_m O_{n-z} \quad \text{formula (3)}$$

wherein B represents at least an element selected from the group consisting of groups 13 through 17 of the periodic table; m, n and z each are an integer of 1 or more.

15. The method of claim 10, wherein in step (b), the aqueous solution containing an inorganic fluoride and the aqueous solution containing $BaX_2$ are added so that a ratio of F of the aqueous inorganic fluoride solution to Ba of the aqueous $BaX_2$ solution is kept constant.

16. The method of claim 10, wherein the inorganic fluoride is ammonium fluoride or an alkali metal fluoride.

17. The method of claim 10, wherein in step (b), the inorganic fluoride is contained in an amount of not less than 12 mol/l.

18. A method for preparing a rare earth activated alkaline earth metal fluorohalide stimulable phosphor represented by the following formula (1):

$$(Ba_{1-x}M^2{}_x)FBr_yI_{1-y} : aM_1, bLn, c0 \quad \text{formula (1)}$$

wherein $M^1$ is at least an alkali metal selected from the group consisting of Li, Na, K, Rb and Cs; $M^2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are numbers meeting the following requirements:

$$0 \leq x \leq 0.5,\ 0 \leq y \leq 0.3,\ 0 \leq a \leq 0.05\ 0 < b \leq 0.2 \text{ and } 0 < c < 0.1$$

the method comprising the steps of:

(a) preparing an aqueous mother liquor containing $BaX_2$ of not less than 2.0 mol/l, in which X is Br or I, provided that when x of the formula (1) is not zero, the mother liquor further contains a halide of $M^2$, and when a is not zero, the mother liquor further contains a halide of $M^1$, (b) adding an aqueous solution containing an inorganic fluoride of not less than 8 mol/l and an aqueous solution containing a halide of Ln to the mother liquor while maintaining a temperature of at least 50° C. to form a crystalline precipitate of a precursor of the stimulable phosphor, (c) separating the precipitate from the mother liquor, and (d) calcining the separated precipitate.

19. The method of claim 18, wherein in formula (1), y and c meet the following requirements:

$$0 < y \leq 0.2 \text{ and } 0 < c \leq 0.1.$$

20. The method of claim 18, further comprising:

adding a compound represented by the following formula (2):

$$A_l B_m O_n \quad \text{formula (2)}$$

wherein A represents a hydrogen atom or at least an element selected from the group consisting of groups 1 and 2 of the periodic table; B represents at least an element selected from the group consisting of groups 13 through 17 of the periodic table; l, m and n each are an integer of 1 or more.

21. The method of claim 20, wherein the compound represented by formula (2) is added before step (d).

22. The method of claim 21, wherein the precursor contains a compound represented by formula (3) in an amount of not less than 5 mg per kg of the precursor:

$$B_m O_{n-z} \quad \text{formula (3)}$$

wherein B represents at least an element selected from the group consisting of groups 13 through 17 of the periodic table; m, n and z each are an integer of 1 or more.

23. The method of claim 18, wherein the inorganic fluoride is ammonium fluoride or an alkali metal fluoride.

24. The method of claim 18, wherein in step (b), the inorganic fluoride is contained in an amount of not less than 12 mol/l.

25. A method for preparing a rare earth activated alkaline earth metal fluorohalide stimulable phosphor represented by the following formula (1):

$$(Ba_{1-x}M^2{}_x)FBr_yI_{1-y} : aM_1, bLn, c0 \quad \text{formula (1)}$$

wherein $M^1$ is at least an alkali metal selected from the group consisting of Li, Na, K, Rb and Cs; $M^2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are numbers meeting the following requirements:

$$0 \leq x \leq 0.5,\ 0 \leq y \leq 0.3,\ 0 \leq a \leq 0.050 < b \leq 0.2 \text{ and } 0 < c \leq 0.1$$

the method comprising the steps of:

(a) preparing an aqueous mother liquor containing an ammonium halide of not less than 3 mol/l, provided that when x of the formula (1) is not zero, the mother liquor further contains a halide of $M^2$, and when a is not zero, the mother liquor further contains a halide of $M^1$, (b) adding an aqueous solution containing an inorganic fluoride of not less than 8 mol/l, an aqueous solution containing $BaX_2$, in which X is Br or I and an aqueous solution containing a halide of Ln to the mother liquor while maintaining a temperature of at least 50° C. to form a crystalline precipitate of a precursor of the stimulable phosphor, (c) separating the precipitate from the mother liquor, and (d) calcining the separated precipitate while avoiding sintering of the precipitate.

26. The method of claim 25, wherein in formula (1), y and c meet the following requirements:

$0 < y \leq 0.2$ and $0 < c \leq 0.1$.

27. The method of claim 25, wherein when c is not zero in formula (1), the method further comprises:

adding a compound represented by the following formula (2)

$$A_l B_m O_n \qquad \text{formula (2)}$$

wherein A represents a hydrogen atom or at least an element selected from the group consisting of groups 1 and 2 of the periodic table; B represents at least an element selected from the group consisting of groups 13 through 17 of the periodic table; l, m and n each are an integer of 1 or more.

28. The method of claim 27, wherein the compound represented by formula (2) is added before step (d).

29. The method of claim 28, wherein the precursor contains a compound represented by formula (3) in an amount of not less than 5 mg per kg of the precursor:

$$B_m O_{n-z} \qquad \text{formula (3)}$$

wherein B represents at least an element selected from the group consisting of groups 13 through 17 of the periodic table; m, n and z each are an integer of 1 or more.

30. The method of claim 25, wherein in step (b), the aqueous solution containing an inorganic fluoride and the aqueous solution containing $BaX_2$ are added so that a ratio of F of the aqueous inorganic fluoride solution to Ba of the aqueous $BaX_2$ solution is kept constant.

31. The method of claim 25, wherein the inorganic fluoride is ammonium fluoride or an alkali metal fluoride.

32. The method of claim 25, wherein in step (b), the inorganic fluoride is contained in an amount of not less than 12 mol/l.

33. A method for preparing a rare earth activated alkaline earth metal fluorohalide stimulable phosphor represented by the following formula (1):

$$(Ba_{1-x}M^2{}_x)FBr_y I_{1-y} : aM^1, bLn, cO \qquad \text{formula (1)}$$

wherein $M^1$ is at least an alkali metal selected from the group consisting of Li, Na, K, Rb and Cs; $M^2$ is at least an alkaline earth metal selected from the group consisting of Be, Mg, Ca and Sr; Ln is at least one rare earth element selected from the group consisting of Ce, Pr, Sm, Eu, Gd, Tb, Tm, Dy, Ho, Nd, Er and Yb; and x, y, a, b and c are numbers meeting the following requirements:

$0 \leq x \leq 0.5$, $0 \leq y \leq 0.2$, $0 \leq a \leq 0.05$ $0 < b \leq 0.2$ and $0 < c \leq 0.1$ the method comprising the steps of:

(a) preparing an aqueous mother liquor containing an ammonium halide of not less than 3 mol/l, provided that when x of the formula (1) is not zero; the mother liquor further contains a halide of $M^2$, and when a is not zero, the mother liquor further contains a halide of $M^1$, (b) adding an aqueous solution containing an inorganic fluoride of not less than 8 mol/l and an aqueous solution containing $BaX_2$, in which X is Br or I to the mother liquor while maintaining a temperature of at least 50° C. to form a crystalline precipitate of an alkaline earth metal fluorohalide, (c) separating the precipitate from the mother liquor, and (d) mixing the separated precipitate with a halide of Ln and then calcining the mixture.

34. The method of claim 33, wherein in step (b), the inorganic fluoride is contained in an amount of not less than 8 mol/l.

35. The method of claim 34, wherein in formula (1), y and c meet the following requirements:

$0 \leq y \leq 0.2$ and $0 < c \leq 0.1$.

36. The method of claim 33, wherein in formula (1), y and c meet the following requirements:

$0 < y \leq 0.3$ and $0 < c \leq 0.1$.

37. The method of claim 33, further comprising:

adding a compound represented by the following formula (2)

$$A_l B_m O_n \qquad \text{formula (2)}$$

wherein A represents a hydrogen atom or at least an element selected from the group consisting of groups 1 and 2 of the periodic table; B represents at least an element selected from the group consisting of groups 13 through 17 of the periodic table; l, m and n each are an integer of 1 or more.

38. The method of claim 37, wherein the compound represented by formula (2) is added before step (d).

39. The method of claim 38, wherein the precursor contains a compound represented by formula (3) in an amount of not less than 5 mg per kg of the precursor:

$$B_m O_{n-z} \qquad \text{formula (3)}$$

wherein B represents at least an element selected from the group consisting of groups 13 through 17 of the periodic table; m, n and z each are an integer of 1 or more.

40. The method of claim 33, wherein in step (b), the aqueous solution containing an inorganic fluoride and the aqueous solution containing $BaX_2$ are added so that a ratio of F of the aqueous inorganic fluoride solution to Ba of the aqueous $BaX_2$ solution is kept constant.

41. The method of claim 33, wherein the inorganic fluoride is ammonium fluoride or an alkali metal fluoride.

42. The method of claim 33, wherein in step (b), the inorganic fluoride is contained in an amount of not less than 12 mol/l.

* * * * *